United States Patent
Bingham, Jr.

(10) Patent No.: US 6,250,847 B1
(45) Date of Patent: Jun. 26, 2001

(54) PIPE HOLDER APPARATUS

(76) Inventor: Thomas R. Bingham, Jr., 204 Bingham Rd., Canterbury, CT (US) 06331

( * ) Notice: Subject to any disclaimer, the term of this patent is extended or adjusted under 35 U.S.C. 154(b) by 0 days.

(21) Appl. No.: 09/275,254

(22) Filed: Mar. 24, 1999

(51) Int. Cl.[7] .................................................. F16L 3/00
(52) U.S. Cl. ............................ 405/154; 248/49; 248/87; 138/106
(58) Field of Search .................... 405/154, 156, 405/157, 172; 248/49, 58, 62, 71, 74.1, 74.2, 74.3, 87, 88; 138/105, 106, 107

(56) References Cited

U.S. PATENT DOCUMENTS

| | | | |
|---|---|---|---|
| 631,317 | * | 8/1899 | Miller ...................................... 248/87 |
| 981,769 | * | 1/1911 | Kinowski ................................ 248/62 |
| 1,772,062 | * | 8/1930 | Zifferer ................................... 248/62 |
| 1,966,899 | * | 7/1934 | McCabe .................................. 248/62 |
| 2,707,608 | * | 5/1955 | Bunn ...................................... 248/62 |
| 3,494,849 | * | 2/1970 | Hess .................................. 204/196.16 |
| 3,568,455 | * | 3/1971 | McLaughlin et al. ................ 405/154 |
| 4,043,139 | * | 8/1977 | Scott ..................................... 405/154 |
| 4,090,686 | * | 5/1978 | Yarbrough .............................. 248/49 |
| 4,107,802 | * | 8/1978 | Patinet et al. ....................... 248/62 X |
| 4,126,012 | * | 11/1978 | Waller .............................. 138/106 X |
| 4,268,189 | * | 5/1981 | Good .................................... 405/154 |
| 4,389,034 | * | 6/1983 | Suttles .............................. 405/172 X |
| 4,492,493 | * | 1/1985 | Webb ................................ 405/154 X |
| 4,494,893 | * | 1/1985 | Migliavacca ....................... 248/49 X |
| 4,790,500 | * | 12/1988 | Mori ....................................... 248/49 |
| 4,826,111 | * | 5/1989 | Ismert .................................... 248/49 |
| 4,981,395 | * | 1/1991 | Datin et al. ...................... 405/154 X |
| 5,007,768 | * | 4/1991 | Waller .............................. 405/154 X |
| 5,042,958 | * | 8/1991 | Stenersen ........................ 405/154 X |
| 5,242,247 | * | 9/1993 | Murphy ............................ 405/154 X |
| 5,437,424 | * | 8/1995 | Netz, Sr. ........................... 248/49 X |
| 5,553,975 | * | 9/1996 | Elkins .............................. 405/154 X |
| 5,590,859 | * | 1/1997 | Lord ...................................... 248/62 |
| 5,785,457 | * | 7/1998 | Thompson et al. ............. 405/154 X |

* cited by examiner

Primary Examiner—David Bagnell
Assistant Examiner—Sunil Singh
(74) Attorney, Agent, or Firm—McCormick, Paulding & Huber LLP

(57) ABSTRACT

A pipe support apparatus includes a sleeve for being positioned along a length of a stake to be inserted into a ground surface of a trench. A sleeve projection extends outwardly from an outer surface of the sleeve. A hook is to extend partially about and cradle a pipe. The hook operatively has an upper end and a lower end, and the hook is pivotally coupled to the sleeve projection at its upper end for movement generally along a vertical plane from a lowered or engaged position to a raised or disengaged position. A handle is coupled to the hook and operatively extends upwardly therefrom for grasping and moving the hook between its engaged and disengaged positions.

20 Claims, 3 Drawing Sheets

PIPE HOLDER APPARATUS

FIELD OF THE INVENTION

The present invention relates generally to an apparatus for supporting pipe, and more particularly to an apparatus for temporarily supporting pipe laid in a trench and during subsequent backfilling of the trench.

BACKGROUND OF THE INVENTION

Laying drainage pipes in sewer systems is a labor intensive and time consuming process. First, a trench must be excavated for accommodating the sewer pipes to be laid in segments along the length of the trench. The elevation of the ground surface of the trench must be meticulously measured periodically along its length to ensure that pipe segments are positioned at the desired elevation. Next, at least two laborers are required to fill-in the trench. One laborer must maintain the pipes in position while the second laborer covers the pipes with backfill material.

U.S. Pat. No. 5,242,247 issued to Murphy provides an apparatus for simplifying the laying of pipes. The apparatus includes a shaft insertable in a trench and multiple parts including an inner sleeve adjustably coupled to the shaft having a bottom pipe support projecting therefrom, and an outer sleeve adjustably fitted over the inner shaft and including a grasping member for securing an upper end of the pipe. A handle is also provided for raising and lowering the grasping member away from and toward the pipe. Once the grasping member is lifted away from the pipe after the pipe has been set in the trench, an additional handle on the top of the shaft must be employed to twist the shaft in order to move the bottom support away from the bottom of the pipe so that the apparatus can then be lifted out of the ground without disturbing the pipe.

U.S. Pat. No. 3,568,455 issued to McClaughlin et al. shows a method of laying pipe which includes an adjustable sleeve receivable by a stake inserted into the ground. The sleeve carries an overhanging bracket shaped to conform around an upper portion of a pipe. A cable underslings the pipe for supporting the pipe in an elevated position. A drawback with this method is that the cable must be released before the pipe is covered with backfill, thus risking movement of the pipe.

Accordingly, it is an object of the present invention to provide a pipe holder apparatus of simple construction which overcomes the above-mentioned drawbacks and disadvantages.

SUMMARY OF THE INVENTION

According to a first aspect of the present invention, a pipe support apparatus includes engagement means positionable along a length of a stake to be inserted into a ground surface of a trench. A projection extends outwardly from an outer surface of the engagement means. A support means is to extend partially about and cradle a pipe. The support means has an upper end and a lower end, and is pivotally coupled to the projection at its upper end for movement generally along a vertical plane between a lowered or engaged position to a raised or disengaged position. A handle is coupled to the support means and operatively extends generally upwardly therefrom for grasping and moving the support means between its engaged and disengaged positions.

According to a second aspect of the present invention, the pipe support apparatus includes a sleeve for being positioned along a length of a stake to be inserted into a ground surface of a trench. A sleeve projection extends outwardly from an outer surface of the sleeve. A hook is to extend partially about and cradle a pipe. The hook operatively has an upper end and a lower end, and is pivotally coupled to the projection at its upper end for movement generally along a vertical plane between a lowered or engaged position to a raised or disengaged position. A handle is coupled to the hook and operatively extends generally upwardly therefrom for grasping and moving the hook between its engaged and disengaged positions.

According to a third aspect of the present invention, a pipe support apparatus includes a stake to be inserted into a ground surface of a trench. A sleeve is positioned along a length of the stake. Means are provided for releasably securing the sleeve to a predetermined position along the length of the stake. A sleeve projection extends outwardly from an outer surface of the sleeve. A hook is to extend partially about and cradle a pipe. The hook operatively has an upper end and a lower end, and is pivotally coupled to the sleeve projection at its upper end for movement generally along a vertical plane between a lowered or engaged position to a raised or disengaged position. A handle is coupled to the hook and operatively extends generally upwardly therefrom for grasping and moving the hook between its engaged and disengaged positions.

DETAILED DESCRIPTION OF THE PREFERRED EMBODIMENTS

Figure 1:
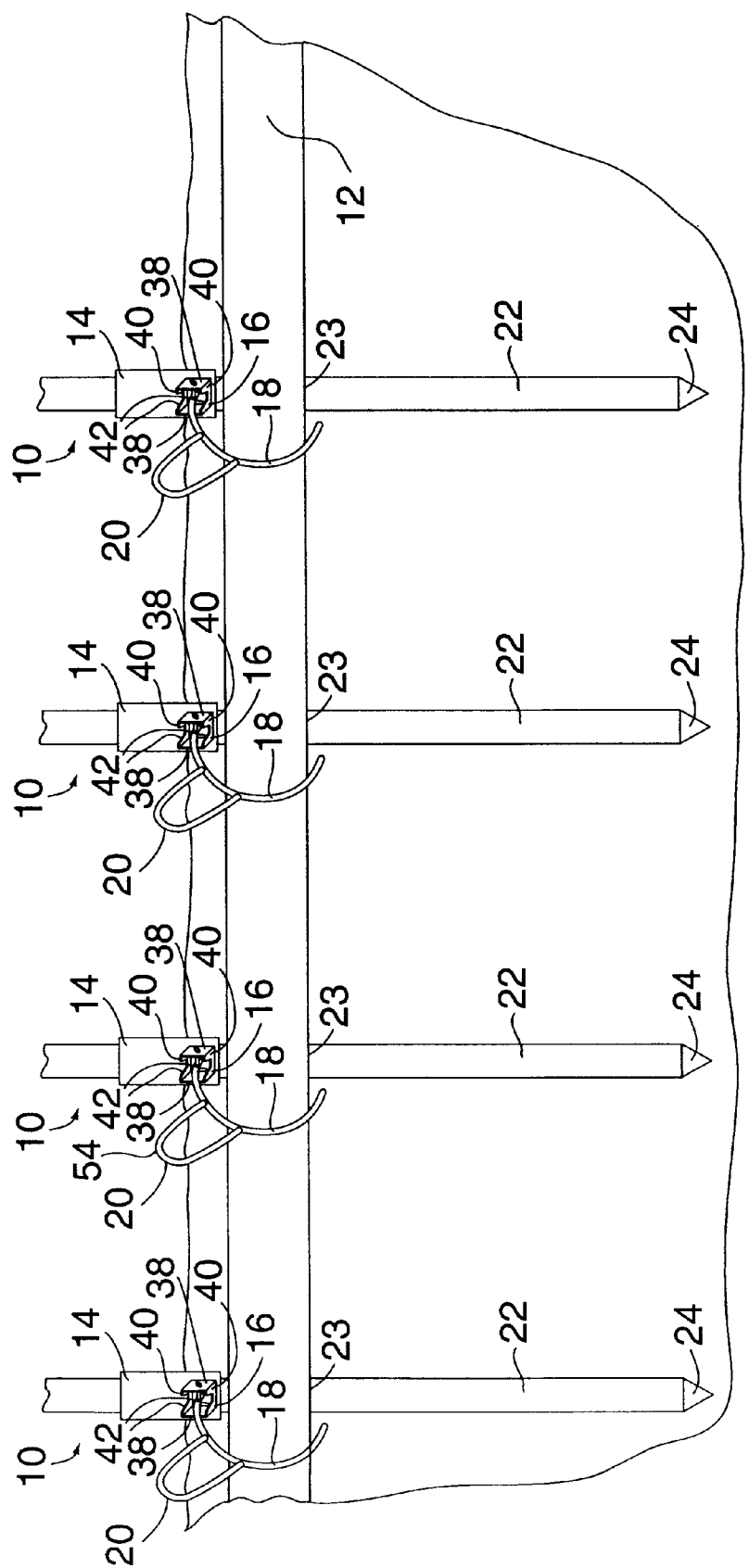
FIG. 1 schematically illustrates a perspective view of a plurality of pipe holder apparatus embodying the present invention spaced along a trench to be laid with pipe.
Figure 2:
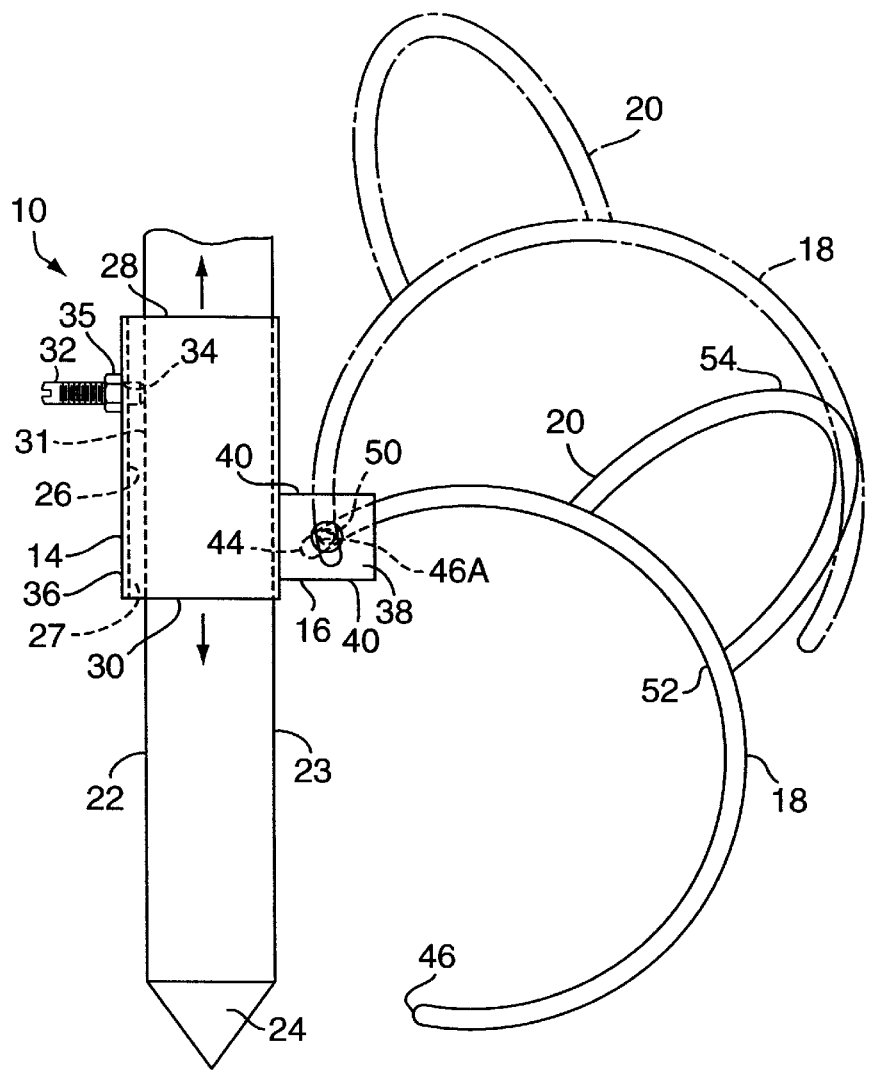
FIG. 2 is a schematic, enlarged elevational view of a pipe holder apparatus of FIG. 1.
Figure 3:
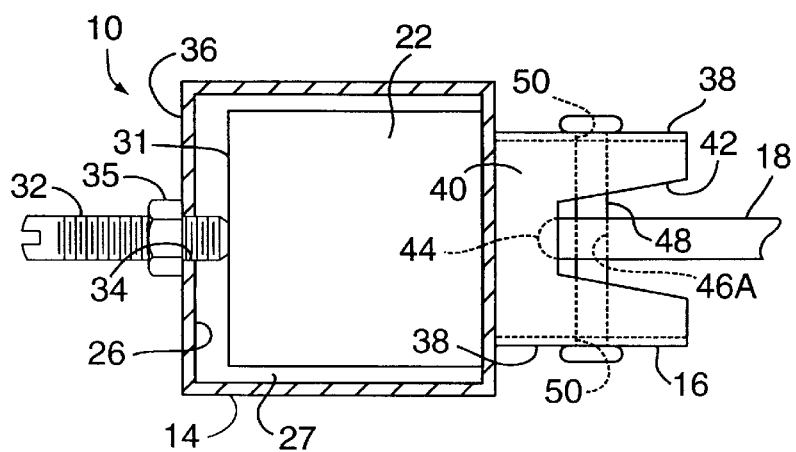
FIG. 3 is a top plan view of a pipe holder apparatus of FIG. 1.

With reference to FIGS. 1–3, a pipe holder apparatus embodying the present invention is generally designated by the reference number 10. As shown in FIG. 1, a plurality of pipe holders 10, 10 are spaced from one another along a length of a trench in order to temporarily support a length of pipe 12 when laying the pipe along the trench and when subsequently backfilling the trench. The pipe 12, shown in FIG. 1 after being covered with backfill material, typically comprises a plurality of pipe segments coupled end-to-end.

Each pipe holder apparatus 10 includes a sleeve 14, a sleeve projection 16, a hook or curved member 18, a handle 20, and means for retaining the sleeve to a stake 22 or elongated member to be temporarily inserted into a ground surface of a trench to be laid with pipe. The retaining means may include, for example, a set screw 32 or any other suitable means for removably securing the sleeve 14 to the stake 22 at a selected position therealong. The stake 22 may be of metal, wood, plastic or any other rigid material suitable for being inserted into the ground and supporting pipe thereabove, the stake having an abutment surface 23 for engaging a portion of a periphery of a pipe. As best shown in FIG. 3, the stake 22 has a cross-section which is square or generally rectangular in a direction along its length, but may also be circular (see FIG. 4) or any other suitable cross-sectional shape. The stake 22 preferably defines a tapered tip 24 to facilitate penetration of the stake into a ground surface.

The sleeve 14 has an inner surface 26 defining a first bore 27 which is square or generally rectangular in cross-section in a direction along a length of the sleeve, and extends along its length from a first end 28 to a second end 30. The inner surface 26 of the sleeve 14 defining the first bore 27 is to be spaced slightly outwardly from an opposing outer surface 31 of the stake 22 when the first bore of the sleeve is received on the stake such that the sleeve may be easily movable to any desired position along a length of the stake in order to adjust the height of the pipe 12 relative to a ground surface of the trench.

An advantage of employing a bore 27 and stake 22 that are square or generally rectangular in cross-section is that the sleeve 14 and the stake mate with and are interlockable with each other to prevent the sleeve from accidentally moving about a longitudinal axis of the stake.

The means for retaining the sleeve 14 to the stake 22 may be, for example, the set screw 32 which is frictionally engageable with the stake. More specifically, the sleeve 14 defines a second, smaller bore 34 extending from an outer surface 36 to the inner surface 26 of the sleeve in a direction generally transverse to that of the first bore 27. The set screw 32 is threadably engageable with the sleeve 14 through the second bore 34 for movement through the second bore and, in turn, for frictionally engaging and disengaging with the outer surface 31 of the stake 22 at any desired longitudinal position therealong. To further support the set screw 32 and to aid in the engagement of the set screw with the second bore 34, a lock nut 35 may be welded or otherwise fixed to the outer surface 36 of the sleeve 14 and centered over the second bore.

The sleeve projection 16 supports the hook or curved member 18 and extends outwardly from the outer surface 36 of the sleeve 14 to facilitate coupling the hook or curved member to the sleeve. As shown in FIGS. 1 and 3, for example, the sleeve projection 16 may be a section of rectangular tube that is welded or otherwise fixed to the outer surface 36 of the sleeve 14. The rectangular tube includes spaced sidewalls 38, 38 serving as brackets, and top and bottom walls 40, 40 defining notches 42, 42 for reasons to be explained.

Figure 4:
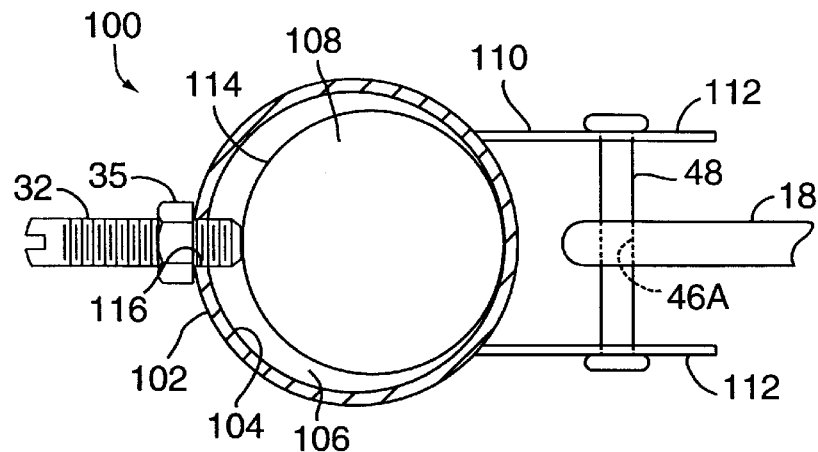
FIG. 4 is a top plan view of a pipe holder apparatus in accordance with a second embodiment of the present invention.

The hook or curved member 18 has a first or upper end 44 and a second, or lower free end 46. Preferably, the hook 18 extends from its first end 44 to its second end 46 along a circular arc of at least 180° so as to cooperate with the abutment surface 23 of the stake 22 to generally surround and support the pipe 12. The first end 44 of the hook 18 defines a hole 46A for receiving an elongated member 48 such as a pin. The pin 48 is itself received and supported adjacent each of its longitudinal ends in holes 50, 50 defined by each of the sidewalls or brackets 38, 38 of the sleeve projection 16 such that the hook 18 is pivotally supported at its first end 44 by the brackets of the projection. The notches 42, 42 defined by the top and bottom walls 40, 40 of the sleeve projection 16 permit the hook 18 to pivot upwardly and downwardly in a vertical plane about an arc without interference from the top and bottom walls, and therefore to move along a greater arc than is possible if there were no notches formed thereon. Of course, the sleeve projection 16 may take other forms. As shown in FIG. 4, for example, the sleeve projection may include two, individuated brackets 112, 112 which are not coupled together by top and bottom walls.

Referring again to FIGS. 1–3, the handle 20 is coupled to the hook 18 and operatively extends generally upwardly therefrom. The handle 20 is loop-shaped, but may take any other practical shape.

In operation, a plurality of the stakes 22, 22 are inserted into a ground surface of a trench in spaced relation therealong. Each stake 22 receives a sleeve 14 typically inserted over a top portion of the stake and moved downwardly to a desired position along the length of the stake corresponding to a height at which the pipe 12 is to be laid relative to the ground surface of the trench. The set screw 32 is then rotated in a direction to threadably move the set screw through the second bore 34 of the sleeve 14 and into frictional engagement with the outer surface 31 of the stake 22 in order to secure or lock the sleeve at the selected position therealong and thus at the selected height relative to the ground surface of the trench.

The handle 20 attached to the hook 18 is then gripped and pulled upwardly which pivots the hook about its first end 44 and thereby moves the hook upwardly along a vertical plane about an arc from a lowered or engaged position (shown in solid form) to a raised or disengaged position (shown in phantom form). The pipe 12 may then be easily positioned against the abutment surface 23 of the stake 22 and below the sleeve projection 16, or against an inner surface 52 of the raised hook. The handle 20 is then lowered to move the hook 18 from its disengaged position to its engaged position where the hook cooperates with the abutment surface 23 of the stake 22 to substantially surround and support or cradle the pipe 12 at a predetermined height above the ground surface of the trench.

The trench is then backfilled such that the pipe 12 is partially or even completely covered with the backfill material, but should not be filled beyond an upwardmost portion 54 of the handle 18 before removing the pipe holder apparatus 10 from the ground surface. As shown in FIG. 1, for example, the pipe 12 is completely covered with backfill material, yet the upwardmost portion 54 of the handle 20 is exposed. When the pipe 12 is partially or completely covered with the backfill material, the backfill material itself now supports the pipe at the desired position in the filled or partially filled trench, and therefore the hook 18 is no longer necessary to support the pipe and therefore may be removed. Because the hook 18 might be completely covered with backfill material, the exposed or upwardmost portion 54 of the handle 20 must be grabbed and pulled upwardly to swing the covered hook generally in a direction away from the pipe and the stake 22 from its engaged position to its disengaged position. At its disengaged position the hook 18 is no longer substantially surrounding the pipe 12 and therefore the stake 22 then may be lifted upwardly out of the ground without disturbing the pipe. The set screw 32, if desired, may then be rotated in a direction to move the set screw through the second bore 34 and out of frictional engagement with the outer surface 31 of the stake 22 to permit the sleeve 14 to be removed from the stake.

FIG. 4 illustrates in top plan view a pipe holder apparatus 100 in accordance with a second embodiment. Like elements with the embodiment of FIGS. 1–3 are labelled with like reference numbers. The pipe holder apparatus 100 includes a sleeve 102 having an inner surface 104 defining a bore 106 which is generally circular in cross-sectional shape in a direction along a length of the sleeve. The sleeve 102 is received over a stake 108 which is also generally circular in cross-sectional shape in a direction along its length. A sleeve projection 110 for pivotally supporting the hook 18 via a pin 48 includes two, individuated brackets 112, 112 which, unlike the sidewalls 38, 38 of the sleeve projection 16 in FIGS. 1–3, are not coupled together by top or bottom walls. A set screw 32 threadably engages with an outer surface 114 of the stake 108 via a second, smaller bore 116 defined by the sleeve 102.

An advantage of the pipe holder apparatus 100 is that the sleeve 102 may be adjusted both in a direction along the length of the stake 108 and in a direction circumferentially about the stake. A second advantage is that the sleeve projection 110 including the individuated brackets 112, 112 is of simpler construction relative to the projection 16 of FIGS. 1–3, and does not require notches to prevent interference of the hook 18 with the projection 110 as it moves along an arc between its engaged and disengaged positions.

Figure 5:
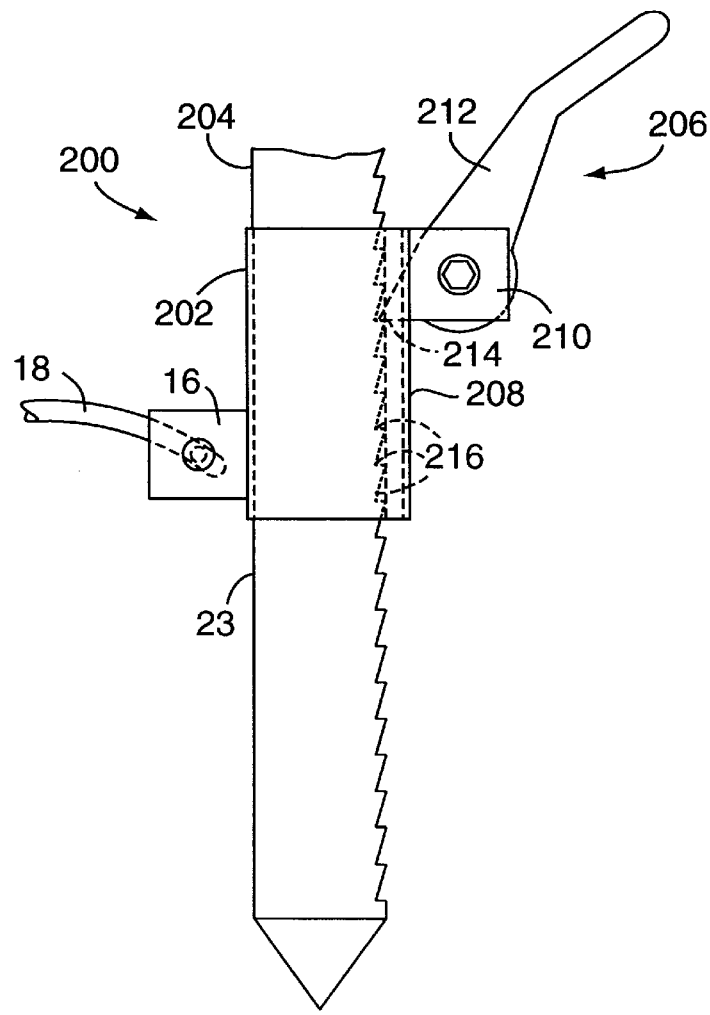
FIG. 5 is a schematic, elevational view of a pipe holder apparatus in accordance with a third embodiment of the present invention.

Referring now to FIG. 5, a pipe holder apparatus in accordance with a third embodiment of the present invention is generally designated by the reference number 200. The pipe holder apparatus 200 is generally similar to the pipe holder apparatus 10 of FIG. 1 except with respect to the means for securing a sleeve 202 to a stake 204. A cam lever assembly generally designated as 206 is fixed to an outer surface 208 of the sleeve 202, and includes a pair of spaced brackets 210, 210 (only one shown) for pivotally supporting a cam lever 212. The lever assembly 206 includes an offset, tapered tip 214 which extends through a slot defined by the sleeve 202 and which is engageable with recesses or divots 216, 216 defined by the stake 204 at spaced intervals of, for example, about an inch, along a length of the stake to secure the sleeve 202 thereto at a desired position. Although the cam assembly 206 has been described as a substitute retaining means for the pipe holder apparatus of FIGS. 1–3, the cam assembly may also be employed as a substitute retaining means for the pipe holder apparatus 100 of FIG. 4.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. For example, a sleeve may be substituted with other means such as movable member that does not surround the stake, such as a member including a projection which mates with and slides along a groove defined by and extending generally along a length of the stake. Accordingly, the present invention has been shown and described by way of illustration rather than limitation.

What is claimed is:

1. A pipe support apparatus, comprising:
   engagement means for being positioned along a length of a stake to be inserted into a ground surface of a trench, the stake having an abutment surface for engaging a portion of a periphery of a pipe;
   a projection extending outwardly from an outer surface of the engagement means;
   support means for extending partially about and cradling the pipe, the support means and the abutment surface of the stake cooperating to generally surround the periphery of the pipe, the support means having an upper end and a lower end, and being pivotally coupled to the projection at its upper end for movement generally along a vertical plane between a lowered or engaged position to a raised or disengaged position; and
   a handle coupled to the support means extending generally upwardly therefrom for grasping and moving the support means between its engaged and disengaged positions.

2. A pipe support apparatus as defined in claim 1, wherein the engagement means is a sleeve.

3. A pipe support apparatus as defined in claim 2, wherein the sleeve defines a bore extending from an outer to an inner surface of the sleeve, and further including a set screw threadably received in the bore for releasable engagement of the set screw with the stake to couple the sleeve to the stake at a desired position along its length.

4. A pipe support apparatus as defined in claim 2, further including a cam lever assembly associated with the sleeve, the cam lever assembly for releasable engagement with recesses defined along a length of the stake to couple the sleeve to the stake at a desired position along its length.

5. A pipe support apparatus as defined in claim 2, wherein the sleeve defines a bore extending along its length, the bore being square or generally rectangular in cross-section in a direction along the length of the sleeve.

6. A pipe support apparatus as defined in claim 2, wherein the sleeve defines a bore extending along its length, the bore being circular in cross-section in a direction along the length of the sleeve.

7. A pipe support apparatus as defined in claim 1, wherein the handle is loop-shaped.

8. A pipe support apparatus as defined in claim 1, wherein the support means is a hook.

9. A pipe support apparatus as defined in claim 8, wherein the hook extends along a circular arc from its upper end to its lower end.

10. A pipe support apparatus as defined in claim 9, wherein the hook arcs at least 180° about a center of the circular arc.

11. A pipe support apparatus, comprising:
    a sleeve for being positioned along a length of a stake to be inserted into a ground surface of a trench, the stake having an abutment surface for engaging a portion of a periphery of a pipe;
    a sleeve projection extending outwardly from an outer surface of the sleeve;
    a hook for extending partially about and cradling the pipe, the hook and the abutment surface of the stake cooperating to generally surround the periphery of the pie, the hook having an upper end and a lower end, the hook being pivotally coupled to the sleeve projection at its upper end for movement generally along a vertical plane between a lowered or engaged position to a raised or disengaged position; and
    a handle coupled to the hook extending generally upwardly therefrom for grasping and moving the hook between its engaged and disengaged positions.

12. A pipe support apparatus as defined in claim 11, wherein the sleeve defines a bore extending from an outer to an inner surface of the sleeve, and further including a set screw threadably received in the bore for releasable engagement of the set screw with the stake to couple the sleeve to the stake at a desired position along its length.

13. A pipe support apparatus as defined in claim 11, further including a cam lever assembly associated with the sleeve, the cam lever assembly for releasable engagement with recesses defined along a length of the stake to couple the sleeve to the stake at a desired position along its length.

14. A pipe support apparatus as defined in claim 11, wherein the sleeve defines a bore extending along its length, the bore being square or generally rectangular in cross-section in a direction along the length of the sleeve.

15. A pipe support apparatus as defined in claim 11, wherein the sleeve defines a bore extending along its length, the bore being circular in cross-section in a direction along the length of the sleeve.

16. A pipe support apparatus as defined in claim 11, wherein the handle is loop-shaped.

17. A pipe support apparatus as defined in claim 11, wherein the hook extends along a circular arc from its upper end to its lower end.

18. A pipe support apparatus as defined in claim 17, wherein the hook arcs at least 180° about a center of the circular arc.

19. A pipe support apparatus, comprising:
- a stake to be inserted into a ground surface of a trench, the stake having an abutment surface for engaging a portion of a periphery of a pipe;
- a sleeve for being positioned along a length of the stake;
- means for releasably securing the sleeve to a predetermined position along a length of the stake;
- a sleeve projection extending outwardly from an outer surface of the sleeve;
- a hook for extending partially about and cradling the pipe, the hook and the abutment surface of the stake cooperating to generally surround the periphery of the pipe, the hook having an upper end and a lower end, the hook being pivotally coupled to the sleeve projection at its upper end for movement generally along a vertical plane between a lowered or engaged position to a raised or disengaged position; and
- a handle coupled to the hook extending generally upwardly therefrom for grasping and moving the hook between its engaged and disengaged positions.

20. A pipe support apparatus as defined in claim 19, wherein the stake defines recesses along its length for engagement with the securing means.

\* \* \* \* \*